(12) United States Patent
Kang et al.

(10) Patent No.: US 8,658,311 B2
(45) Date of Patent: Feb. 25, 2014

(54) HIGH TEMPERATURE RECHARGEABLE BATTERY FOR GREENHOUSE GAS DECOMPOSITION AND OXYGEN GENERATION

(71) Applicants: Bruce S. Kang, Morgantown, WV (US); Huang Guo, Morgantown, WV (US)

(72) Inventors: Bruce S. Kang, Morgantown, WV (US); Huang Guo, Morgantown, WV (US)

(*) Notice: Subject to any disclaimer, the term of this patent is extended or adjusted under 35 U.S.C. 154(b) by 0 days.

(21) Appl. No.: 13/708,541

(22) Filed: Dec. 7, 2012

(65) Prior Publication Data

US 2013/0122381 A1    May 16, 2013

(51) Int. Cl.
*H01M 10/0525* (2010.01)
(52) U.S. Cl.
USPC .................................................. 429/209
(58) Field of Classification Search
None
See application file for complete search history.

(56) References Cited

U.S. PATENT DOCUMENTS

| | | | |
|---|---|---|---|
| 2006/0188433 A1* | 8/2006 | Weimer et al. | 423/622 |
| 2008/0029388 A1* | 2/2008 | Elangovan et al. | 204/242 |
| 2008/0118635 A1* | 5/2008 | Larsen | 427/115 |
| 2009/0087690 A1* | 4/2009 | Jose la O' et al. | 429/2 |
| 2012/0222951 A1* | 9/2012 | O'Connor | 204/157.43 |

OTHER PUBLICATIONS

Boehm et al, Oxygen diffusion and transport properties in non-stoichiometric Ln2-xNiO4+δ oxides, Solid State Ionics 176 (2005) 2717-2725.*

* cited by examiner

*Primary Examiner* — Patrick Ryan
*Assistant Examiner* — Jose Colucci Rios

(57) ABSTRACT

Instead of CCS technique, a possible approach to mitigate the greenhouse gas (GHG) emission is to decompose it into useful products. This invention shows a high temperature rechargeable battery system for decomposition of oxygen-containing gases (e.g $CO_2/H_2O$, $NO_x$, $SO_x$, in particular GHG), oxygen generation, and energy storage by using ODF/$La_2NiO_4$-based materials in Li/Ti/Mg—$CO_2$ battery architecture. Different from ionic Lithium conducting electrolyte, the invention has a higher ionic oxygen conducting electrolyte to work efficiently at higher temperature without sacrificing safety. During battery discharge, GHG can be decomposed into syngas (CO+$H_2$) or solid carbon, while renewable energy (e.g. solar/wind power) could be used to charge the battery and generate oxygen. The energy consumption for GHG decomposition is self-sustainable and the byproducts (i.e. carbon/syngas and oxygen) have good market values. The adoption of cost effective materials other than Lithium is significant for scaled-up applications and represents an entirely new approach.

1 Claim, 5 Drawing Sheets

HIGH TEMPERATURE RECHARGEABLE BATTERY FOR GREENHOUSE GAS DECOMPOSITION AND OXYGEN GENERATION

BACKGROUND OF THE INVENTION

1. Field of Invention

The present invention relates to the high temperature rechargeable battery system using oxygen ion conducting electrolyte which could be capable of utilizing renewable energy sources such as solar or wind power for energy storage and efficiently converting GHG, into useable syngas, solid carbon and oxygen. The byproducts which have good market values can be used as fuel or for further processing. The usage of cheaper electrode materials (i.e. $Ti/TiO_2$, $Mg/MgO$) other than Lithium can significantly reduce material cost of the scaled-up battery system and work efficiently at higher temperature without sacrificing safety.

2. State of the Art

As we continue our dependence on fossil fuels, there is an ever increasing need for the control and regulation of the greenhouse gases that are emitted during the burning of coal, oil and natural gas. Coal, oil and natural gas continue to supply close to 90% of the world's current energy needs, however their use comes at a cost, as the greenhouse gases emitted during their use, most notably, $CO_2$, is a significant driver of global climate change. It was reported that arctic $CO_2$ levels on Jun. 1, 2012 has exceeded the symbolic 400 ppm level, a level that scientists agree point to a more rapid increase in the global mean temperature.

Current approaches for the reduction of $CO_2$ emission from large-scale fossil fuel facilities focus on carbon capture and storage (CCS) [Advanced Research Projects Agency—Energy, IMPACCT 2009]. Capture of $CO_2$ for recycling, which is faced with several challenges as it is still in its infancy and very costly, can be achieved by absorption processes employing amines or carbonates as absorbents. The regeneration requires heating of the absorbent. This process consumes a significant portion (~25%) of the power plant energy output. Thus, energy consumption of the process must be reduced in order to fully realize the utility of $CO_2$ recycling. Moreover, the captured $CO_2$ is to be sequestrated to a permanent place which is another energy-consuming process and eventually, available/suitable sites for CCS sequestration will be limited.

Other preferable technology currently being examined is using captured, anthropogenically produced $CO_2$ for the synthesis of syngas through the use of catalysts or solid oxide electrolyte cells (SOEC) [A. Ambrosini, et al., Advances in $CO_2$ Conversion and Utilization, Chapter 1, 1-13, American Chemical Society 2010; F. Bidrawn, et al., Electrochemical and Solid-State Letters, 11 (9), 2008, p. B167-B170; M. R. Haines, et al., Journal of Power Sources, 106, 2002, p. 377-380; A. Amorelli, et al, Energy, 29, 2004, p. 1279-1284, C. M. soots, 2006 Fuel Cell Seminar, INL/CON-06-11719, Q. Fu, C. Mabilat, et al, Energy & Environmental Science, 3, 2010, p. 1382-1397]. Syngas can be utilized as substitute fuel gas for power plants or existing industrial boilers. Syngas can also be further processed into hydrocarbon and carbonaceous fuels, such as Diesel, Methanol, Ammonia, and so on. These techniques, in order to be successful, would have to be reproducible, high performing and have long-term stability and relatively low energy consumption. Recently, a new $CO_2$-rich gas-utilizing battery has been developed [Kensuke Takechi, et al. (2011), Chem. Commun., 47, 3463-3465]. This $Li$—$O_2$/$CO_2$ battery utilizes a mixed gas of $O_2$ and $CO_2$, and has nearly three times of discharge capacity than that of a standard $Li$—$O_2$ battery. The disadvantage of it is that this kind of new battery is non-rechargeable due to the difficulty of electrochemical decomposition of $Li_2CO_3$ in the cathode.

SUMMARY OF THE INVENTION

The present invention utilizes a central module composed of a rechargeable Li/Ti/Mg battery consisting of an ODF/$La_2NiO_4$-based cathode, a carbon-free ion conducting electrolyte (e.g. YSZ, GDC, $LaGaO_3$) and a Li/Ti/Mg anode. Renewable energy sources such as solar or wind energy can be utilized to charge the battery, where the Li/Ti/Mg oxides can be reduced to metallic Li/Ti/Mg at the anode, producing pure oxygen at the cathode as a side product. In the battery discharge mode, at elevated temperatures, $CO_2$ or a combination of $CO_2$/$H_2O$ can be fed into the cathode side, generating syngas ($CO+H_2$) and/or solid carbon while simultaneously generating electricity. The energy consumption for $CO_2$ decomposition is self-sustainable with the integrated system, i.e. using renewable energy such as solar or wind energy, and the byproducts (i.e. solid carbon, syngas ($CO+H_2$), $O_2$) have good market values.

Instead of the Lithium ion conducting electrolyte in traditional Li ion battery, the oxygen ion conducting electrolytes has higher ionic conductivity [O. Yamamoto, Electrochim. Acta 45 (2000) 2423-2435; E. Ivers-Tiffee, A. Weber, D. Herbstritt, J. Eur. Ceram. Soc 21 (2001) 1805-1811; Guangchao Li, Yuping, Wu et al., Pure Appl. Chem., Vol. 80, No. 11, 2553-2563, 2008] and eliminates the safety problem associated with using organic/flammable electrolytes without causing cathode clogging. The elevated operating temperature enhances its high ionic oxygen conductivity and battery efficiency as well. The adoption of cost effective anode materials (i.e. $Ti/TiO_2$, $Mg/MgO$) other than Lithium is significant for scaled-up applications and represents an entirely new approach.

DETAILED DESCRIPTION OF THE INVENTION

Figure 1:
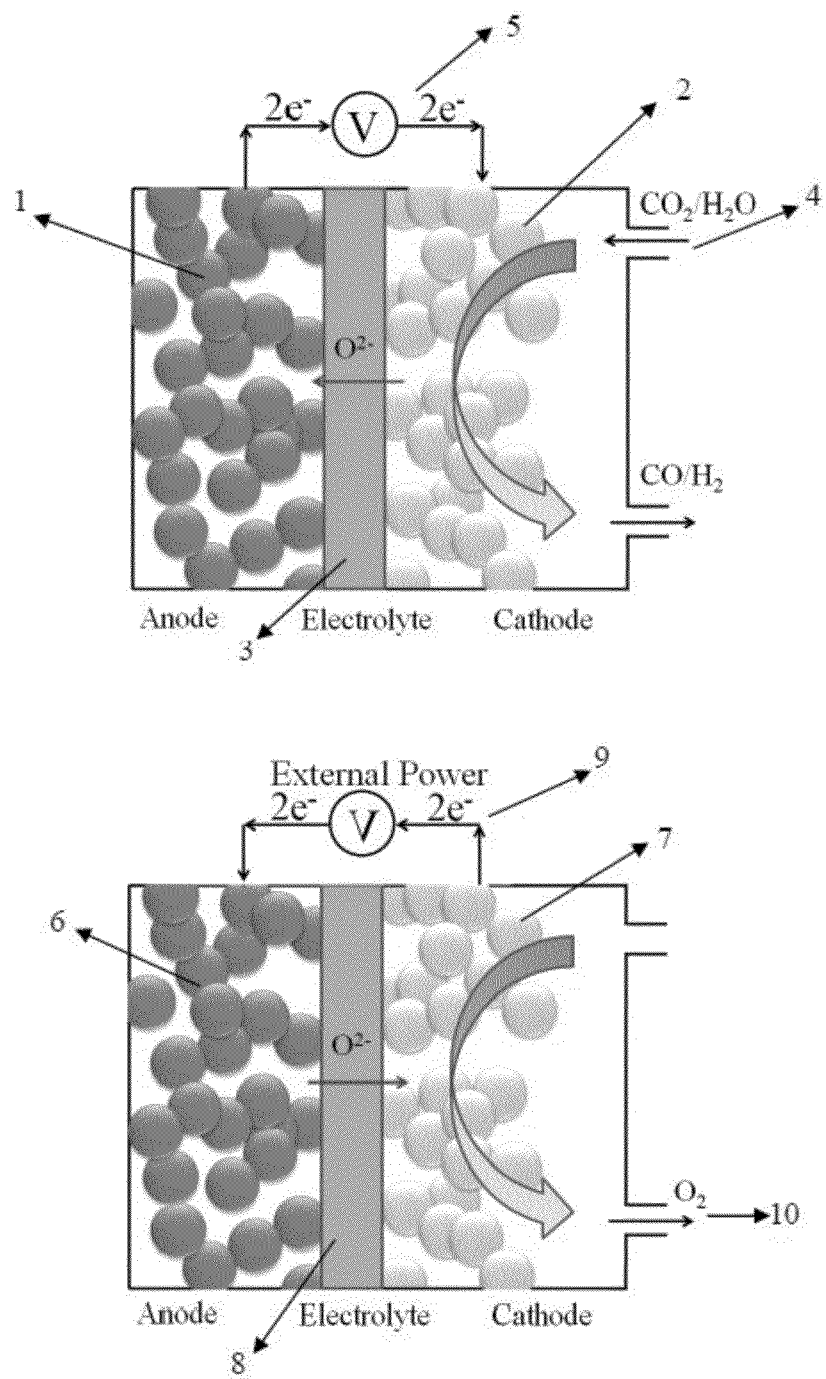
FIG. 1 shows the principle of rechargeable battery: (a) discharge and (b) charge

The central module of the battery system is shown in FIG. 1. The $Li/Li_2O_2$ or other metal/metal oxide materials (e.g. $Ti/TiO_2$, $Mg/MgO$) are fixed at anode electrode 1, while the cathode electrode 2 consists of the corresponding electrolyte particles and catalyst for $CO_2$ decomposition, such as ODF (oxygen-deficient ferrite) and/or $La_2NiO_4$-base particles. Here, the traditional Lithium ion conducting electrolyte in Li-ion batteries is replaced with an oxygen ion conducting electrolytes 3, such as Zirconia-based solid electrolytes (YSZ), $LaGaO_3$-based electrolytes, or doped Ceria electrolytes (GDC), which can endure higher operating temperature and have higher ionic conductivity (e.g. >0.05 S/cm for $O^{2-}$ in YSZ vs. $10^3$~$10^{-4}$ S/cm for $Li^+$) [O. Yamamoto, Electrochim. Acta 45 (2000) 2423-2435; E. Ivers-Tiffee, A. Weber, D. Herbstritt, J. Eur. Ceram. Soc 21 (2001) 1805-1811;

Guangchao Li, Yuping, Wu et al., Pure Appl. Chem., Vol. 80, No. 11, 2553-2563, 2008]. Different from the flammable organic electrolyte, which leads to rupture and ignition of the battery at high temperatures, the oxygen ion conductors are attractive from a safety standpoint. Meanwhile, the ionic oxygen conductivity increases as the temperature elevates, which means that heat generated by the exothermic electrode reaction and passing current cross the battery system can be utilized.

Both ODF and $La_2Ni_{1-x}M_xO_4$ (M=Fe, Co, Cu, etc) based materials have been extensively studied and found to be efficient catalytic materials for the reforming of $CH_4$ and $CO_2$ decomposition [Tamaura, et al., Nature 346, 255-256 (1990); Tamaura, et al., Carbon 33 (10), 1443-1447 (1995); K. Sutthiumpor, et al., International Journal of Hydrogen Energy 36, I4435-I4446 (2011); C. Batiot-Dupeyrat, et al., Applied Catalysis A: General 248, 143-151 (2003)]. ODF can decompose $CO_2$ gas to carbon with an efficiency of nearly 100% at temperature above 300° C. and can be used repeatedly for such a conversion [Tamaura, et al., Nature 346, 255-256 (1990)]. At 800° C., $La_2NiO_4$ can have up to 100% $CH_4$ reforming and 92% $CO_2$ conversion efficiency [C. Batiot-Dupeyrat, et al., *Applied Catalysis A: General*, 248, 143 (2003)]. $La_2NiO_4$ has a high electronic conductivity and oxygen ion conductivity because of the interstitial oxygen defect. Due to their high electronic conductivity, oxygen ion conductivity and catalytic performance for $CO_2$, $H_2O$, and even $NO_x$, either $La_2NiO_4$ or ODF materials can be integrated as battery cathode 2. The introduced gas 4 for battery system can be shifted from air ($O_2$) to $CO_2$-rich gas, while under potential 5 the generated ionic oxygen is transported across the electrolyte 3 and reacts with the anode materials 1. Our in-house preliminary test results have demonstrated that both $La_2NiO_4$ and ODF can efficiently decompose $CO_2$ into solid C or CO continuously [Huang Guo, Bruce S. Kang and Ayya. Mani., Proceedings of PEiME 2012, Honolulu, Hawaii, Oct. 7-12, 2012; Bruce Kang, Huang Guo, Gulfam Iqbal, Ayyakkanna Manivannan, "$CO_2$ Conversion into C/CO using ODF Electrodes with SOEC," Accepted by The American Ceramic Society's Ceramic Transactions volume].

In the battery discharge mode, the cathode reaction in the battery system at temperature greater than 700° C. is shown in Equations [1] and [2]:

Cathode Reaction:

$$CO_2 + 2e^- \rightarrow CO + O^{2-} \tag{1}$$

$$H_2O + 2e^- \rightarrow H_2 + O^{2-} \tag{2}$$

At anode side, the metallic Li, Ti or Mg particles are mixed with the corresponding electrolyte particles, while the ionic oxygen transported from the cathode will react with the Li, Ti or Mg and release heat and electrons, as shown in Equations. [3]-[5].

Anode Reaction:

$$2Li + O^{2-} \rightarrow 2e^- + Li_2O \tag{3}$$

$$Ti + O^{2-} \rightarrow 2e^- + \tfrac{1}{2}TiO_2 \tag{4}$$

$$Mg + O^{2-} \rightarrow 2e^- + MgO \tag{5}$$

Overall Reaction:

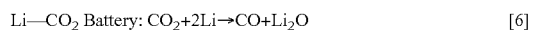
$$\text{Li—CO}_2 \text{ Battery: } CO_2 + 2Li \rightarrow CO + Li_2O \tag{6}$$

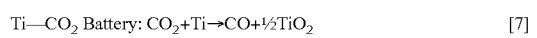
$$\text{Ti—CO}_2 \text{ Battery: } CO_2 + Ti \rightarrow CO + \tfrac{1}{2}TiO_2 \tag{7}$$

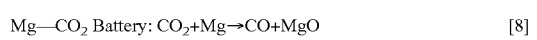
$$\text{Mg—CO}_2 \text{ Battery: } CO_2 + Mg \rightarrow CO + MgO \tag{8}$$

A mixture of $CO_2/H_2O$ or $Air/O_2$ can be introduced to the system in order to increase the cell potential and efficiency. The electrode reaction is highly exothermic and the current passing through the battery also generates heat which can be utilized to maintain the temperature necessary for battery operation. It should be noted that while the $Ti/TiO_2$ electrode does suffer from high resistivity at room and intermediate temperatures which limits its applications in room-temperature battery systems, the proposed system takes advantage of the oxygen deficient Magnelli phase, $TiO_{2-x}$, which is highly conducting at temperature above 700° C. [G. Z. Chen, D. J. Fray, T. W. Farthing, "Direct electrochemical reduction of titanium dioxide to titanium in molten calcium chloride," Nature, 407, 361-364 (September) 2000] and will enhance the application of the $Ti/TiO_2$ electrode in this proposed high temperature rechargeable battery system. Furthermore, with the use of nano-manufacturing technique, other interfacial materials (e.g. graphite, in particular graphene) could be added to the anode to optimize the electrode microstructure for better electrical conductivity and lower resistivity, and thus further improve the battery performance.

$Li_2O_2$, $TiO_2$ or MgO are easily electrochemically decomposed which means that the proposed battery system is rechargeable. To charge the battery, as shown in FIG. 1(b) the required external power 6 can be obtained from a renewable source such as solar or wind power. During charging, the metal oxide 7 is reduced to the metallic state, while the generated oxygen ion is transported through the electrolyte 8 to the anode side 9 where it can combine to form pure oxygen gas 10 without further processing as shown in Equations. [9]-[11].

Overall Reaction of the battery system in charge mode:

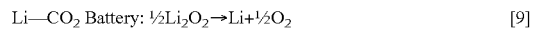
$$\text{Li—CO}_2 \text{ Battery: } \tfrac{1}{2}Li_2O_2 \rightarrow Li + \tfrac{1}{2}O_2 \tag{9}$$

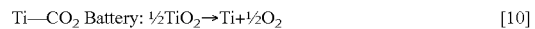
$$\text{Ti—CO}_2 \text{ Battery: } \tfrac{1}{2}TiO_2 \rightarrow Ti + \tfrac{1}{2}O_2 \tag{10}$$

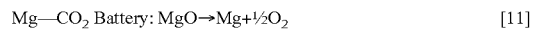
$$\text{Mg—CO}_2 \text{ Battery: } MgO \rightarrow Mg + \tfrac{1}{2}O_2 \tag{11}$$

Figure 2:
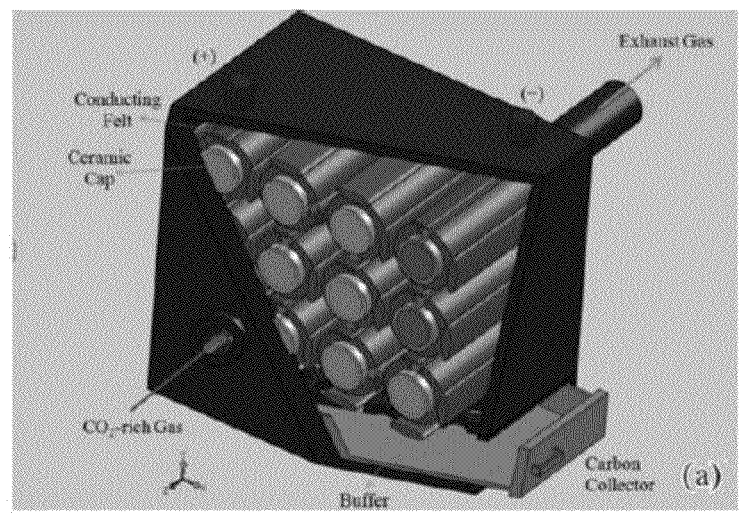
FIG. 2 shows a structural design of rechargeable battery stack: (a) tubular stack and (b) planer stack
Figure 2:
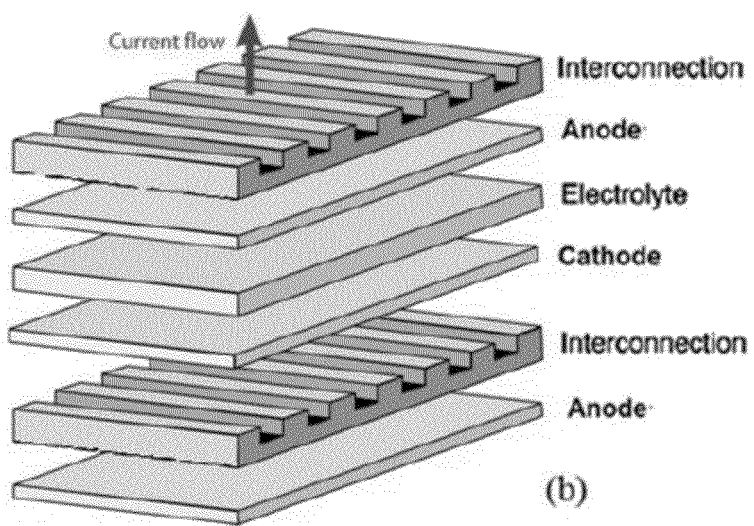

Using the proposed technology, $CO_2$ can be converted to useable syngas and the byproducts of solid carbon, syngas (CO—$H_2$) and $O_2$ have high economic values. For large scale utilization of $CO_2$ rich gas, the prototype of the proposed battery system can be designed with two configurations analogous to the SOFC structure, tubular or planar, as illustrated in FIG. 2. The configurations are easy to be assembled into large-scale cell stacks capable of large-scale electrical energy storage and $CO_2$ decomposition with $O_2$ generation.

The proposed high temperature rechargeable Li/Ti/Mg—$CO_2$ battery and energy storage system is new. Great opportunities will exist for technology licensing and partnership with OEM companies in transportation and power utility industries. The advantages of the proposed Li/Ti/Mg—$CO_2$ battery system can be summarized as following:

1): Instead of the Lithium ion conducting electrolyte in traditional Li ion battery, the use of oxygen ion conducting electrolytes eliminates the safety problem associated with using organic/flammable electrolytes without causing cathode clogging, and the elevated operating temperature enhances its high ionic oxygen conductivity and battery efficiency.

2): The elevated operating temperature (>700° C.) of the proposed rechargeable battery system will have high electric conductivity and overcomes the obstacle of high resistivity of $Ti/TiO_2$ and Mg/MgO electrodes at room and intermediate temperatures.

3): Instead of just energy consumption necessary for $CO_2$ decomposition, $CO_2$ can be viewed as a directly useable gas for the proposed rechargeable battery system. The energy consumption for $CO_2$ decomposition is self-sustainable with the utilization of renewable energy source such as solar or wing energy.

4): The proposed high temperature rechargeable battery system can generate high quality oxygen on the catalytic cathode during the charge mode, while during the discharge mode, it generates electricity and the decomposed byproduct, i.e. syngas ($CO+H_2$), and solid carbon on the catalytic cathode, are valuable byproducts which can offset the cost of GHG decomposition/sequestration or even make this a profitable operation.

5): The proposed system is capable of in-situ methanation which can be used to remove deposited carbon. Alternatively, carbon can be removed by a mechanical or chemical process as the byproduct 6): Specifically, the usage of cheaper anode materials (i.e. $Ti/TiO_2$, $Mg/MgO$) other than Lithium is significant for scaled-up applications and represents an entirely new approach. The proposed technology can significantly reduce material cost of the scaled-up high temperature rechargeable battery system.

7): The proposed rechargeable battery system provides high voltage capacity and is suitable for solar or wind power energy storage.

EXAMPLE 1

Figure 3:
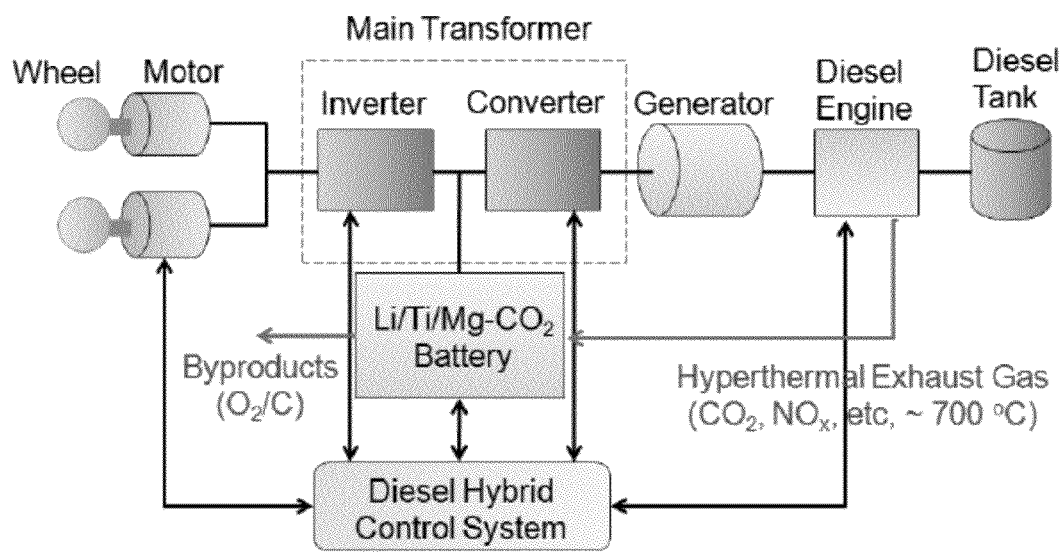
FIG. 3 shows the invention applied to freight transportation.

A prototype of battery stack comprising 12 cells in series configuration as illustrated in FIG. 2(a) is illustrated. FIG. 3 shows its application in freight transportation. The exhaust gas from freight vehicles (diesel engines) is introduced to this stack. The hyperthermal exhaust gas from the diesel engines (usually close to 700° C.) [Shaolin Mao, et al., Journal of Thermal Science and Engineering Applications 3, 2011, 041007] is not the useless or even polluting gas anymore. It can be directly feed to the battery stack to generate commercially marketable byproducts like carbon black and oxygen, while the heat can be utilized to start the electrochemical reaction within the battery system. Therefore, the energy consumption for $CO_2$ decomposition can be self-sustainable with the integrated system and the byproducts such as the solid carbon particles can be collected, while the generated syngas ($CO+H_2$) and $O_2$ can also be collected or just simply looped back to the engine if it's a natural gas (NG) driven engine. Like other hybrid electric vehicles (HEVs), efficiency-improving technologies, such as regenerative braking, internal combustion engine (ICE), or even the solar panels, can be used to charge the proposed rechargeable battery system.

EXAMPLE 2

Figure 4:
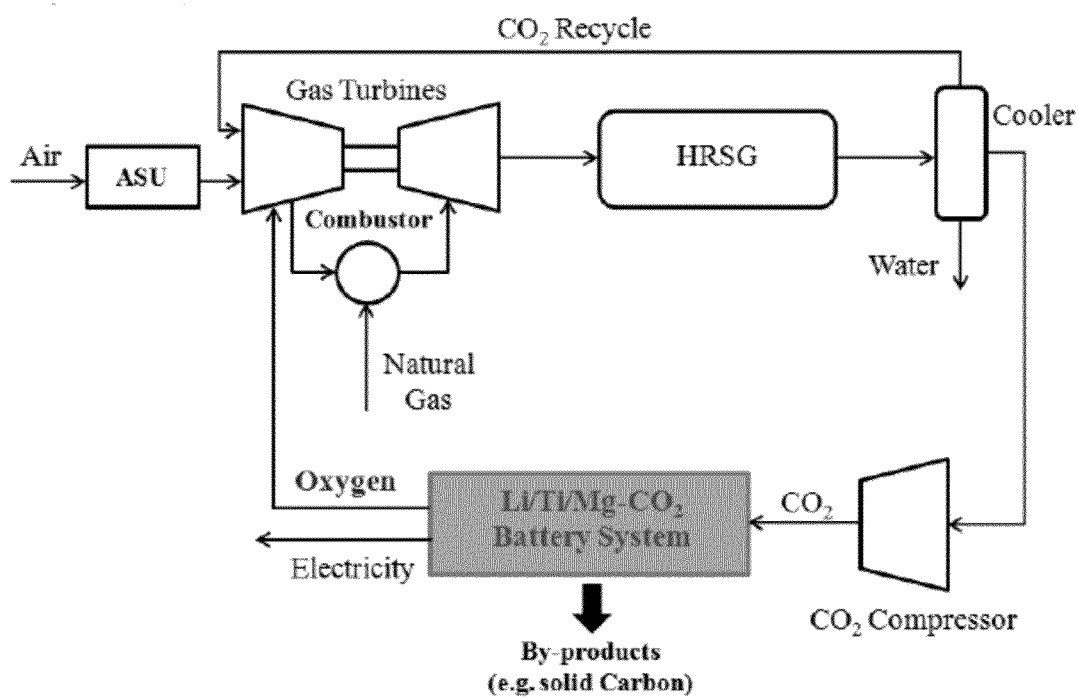
FIG. 4 shows the natural gas oxy-combustion technology integrated with the invention.

The proposed high temperature rechargeable battery system can be applied to fossil fuel power plant for supplementing CCS. FIG. 4 shows its application in nature gas oxy-combustion technology. Oxyfuel combustor is supplied by pure oxygen or oxygen diluted with $CO_2$ instead of atmospheric air for burning fuel to achieve higher energy density. The oxygen supply for gasifiers requires a cryogenic Air Separation Unit (ASU), which accounts approximately 25% of the plant operating and maintenance cost. The products of the natural gas oxy-combustion are just $CO_2$ and $H_2O$ of which $H_2O$ can be easily separated. After water condensation, it produces a relatively pure stream of $CO_2$ (Syamlal et al. Carbon Sequestration, DOE/NETL 2008), which can be either captured or re-circulated back into combustor to dilute oxygen flux and control the flame temperature. Integrated with the proposed battery system, the exhausted $CO_2$ can be further decomposed into syngas ($CO+H_2$) and solid carbon while generating electricity. When the battery is in charged by solar, wind or other renewable power, the produced oxygen can be simply looped back to the combustor. It is estimated that the oxygen recirculation will save approximately 14.59 kJ/mol of $O_2$.

EXAMPLE 3

Figure 5:
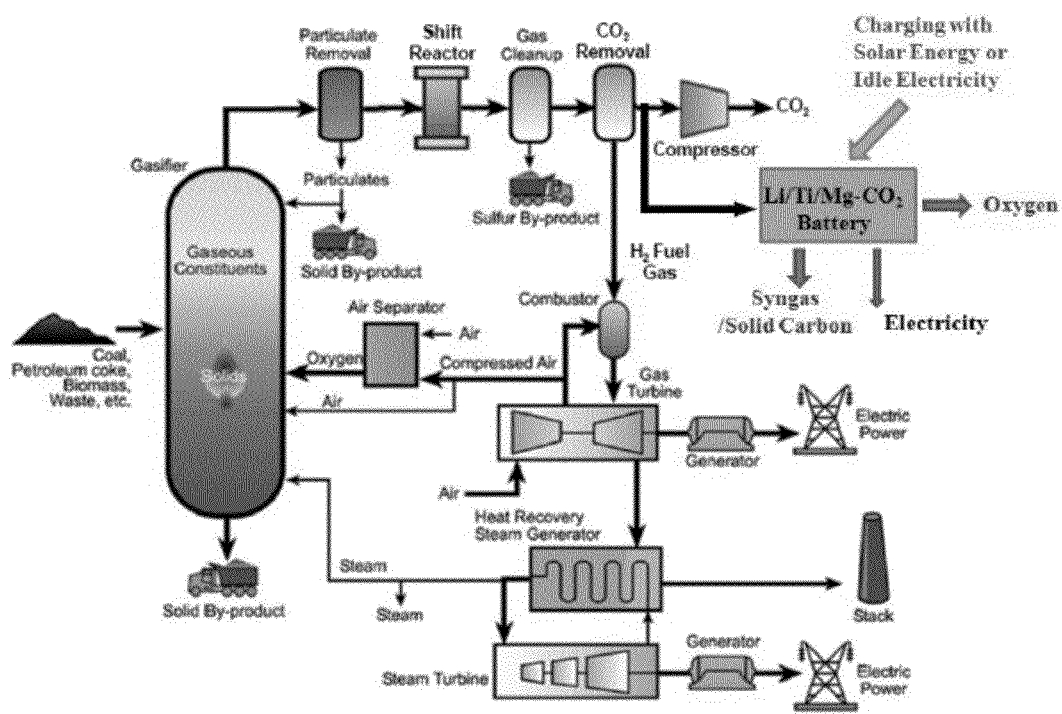
FIG. 5 shows the integrated gasification combined cycle (IGCC) technology integrated with the invention.

FIG. 5 shows application of the proposed battery system in the integrated gasification combined cycle (IGCC) power plant. There are several operational IGCC plants in the U.S. The process starts by heating coal under pressure to create a methane-rich gas, which, after cleaning, can be used in a combined-cycle unit (gas and steam turbines) for efficient electricity generation. With CCS, IGCC plants could capture 85-95 percent of $CO_2$ emission. Instead of being injected into deep underground formations, the captured $CO_2$ can be further decomposed into syngas ($CO+H_2$)/solid carbon and generate additional electricity with the assistance of proposed battery system. Solar, wind or other renewable power will be utilized to charge the battery, while the produced pure oxygen can be simply looped back to the combustor.

The invention claimed is:

1. A high temperature rechargeable battery system for decomposition of oxygen-containing gases such as $NO_x$, $SO_2$, $H_2O$, $CO_2$, in particular greenhouse gas (GHG), oxygen generation and energy storage is invented by introducing an oxygen-deficient ferrites ($M_xFe_{3-x}O_{4-5}$, M represents a bivalent metal ion, in particular Fe(II), Cu(II), Co(II), Mn(II) or Ni(II)) and/or $La_2NiO_4$-based materials into rechargeable Li/Ti/Mg—$CO_2$ batteries, wherein during discharge of the battery, oxygen-containing gases like GHG can be decomposed into syngas ($CO+H_2$) or solid carbon while renewable energy such as solar or wind energy can be used to charge the battery and generate pure oxygen.

* * * * *